March 9, 1954
A. S. PRICE
2,671,599
STORAGE BATTERY TOP PROTECTOR
Filed July 25, 1950
3 Sheets-Sheet 1
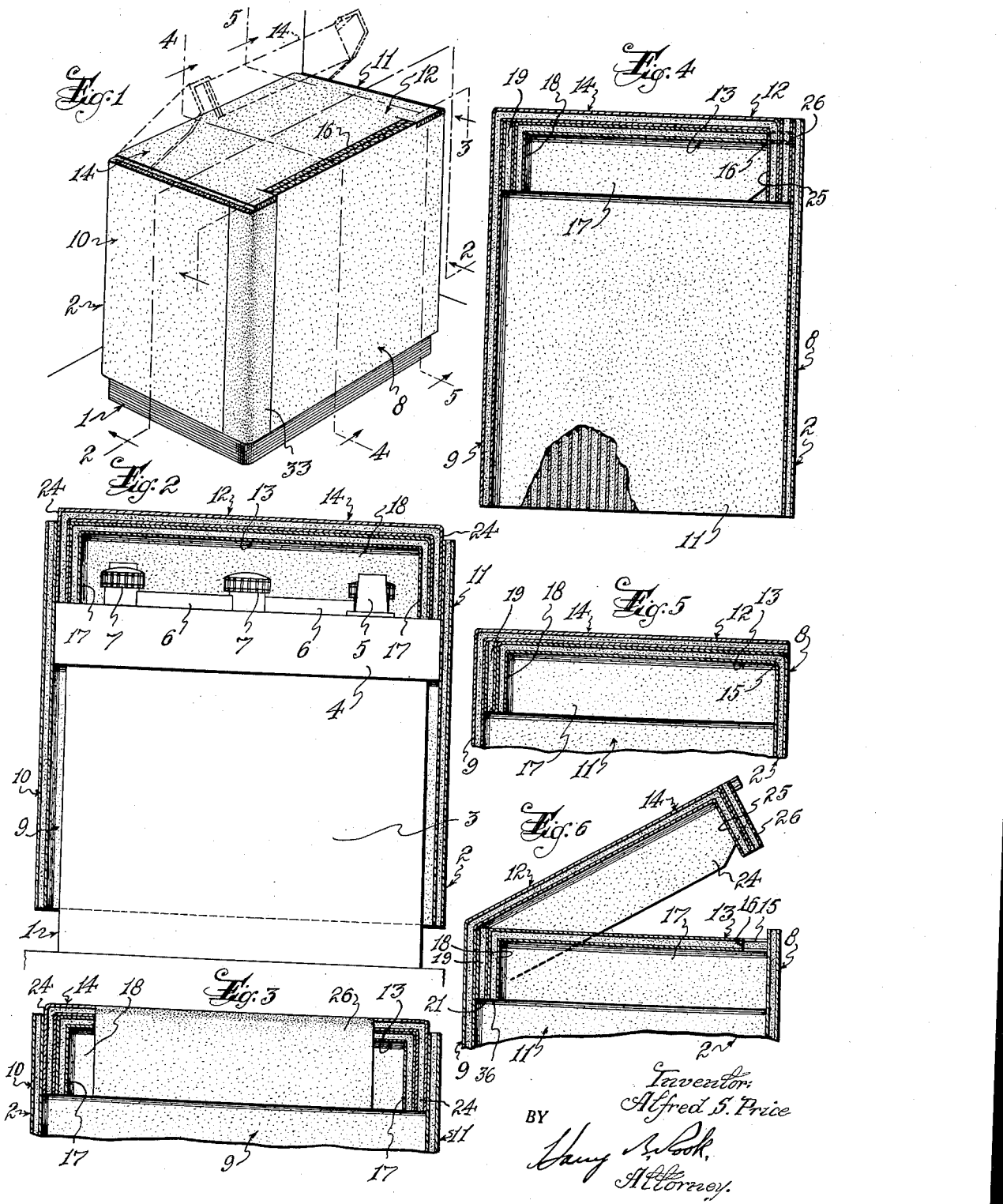
Inventor:
Alfred S. Price
BY
Harry J. Rook.
Attorney.

March 9, 1954  A. S. PRICE  2,671,599
STORAGE BATTERY TOP PROTECTOR
Filed July 25, 1950  3 Sheets-Sheet 2
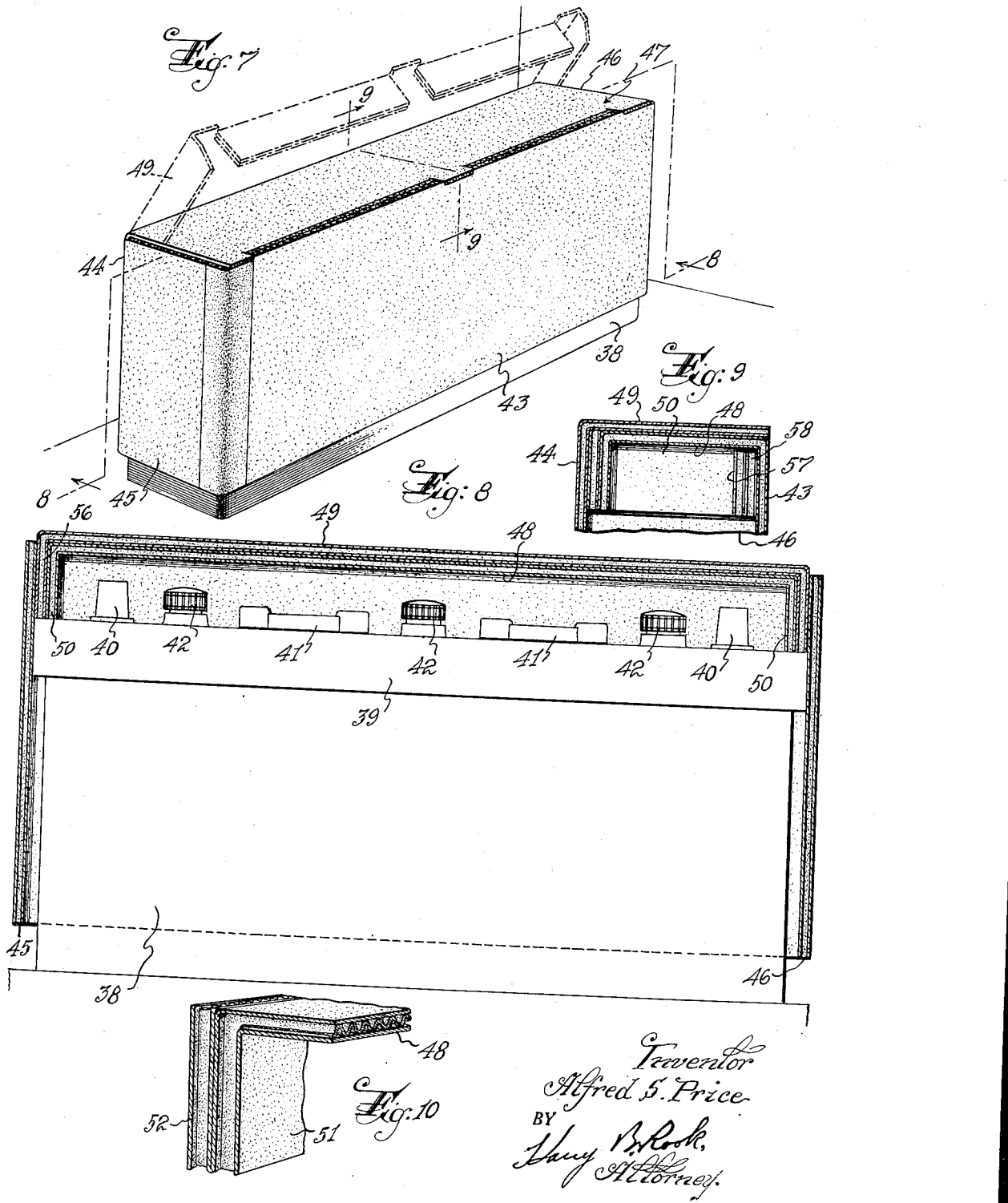

March 9, 1954
A. S. PRICE
2,671,599
STORAGE BATTERY TOP PROTECTOR
Filed July 25, 1950
3 Sheets-Sheet 3
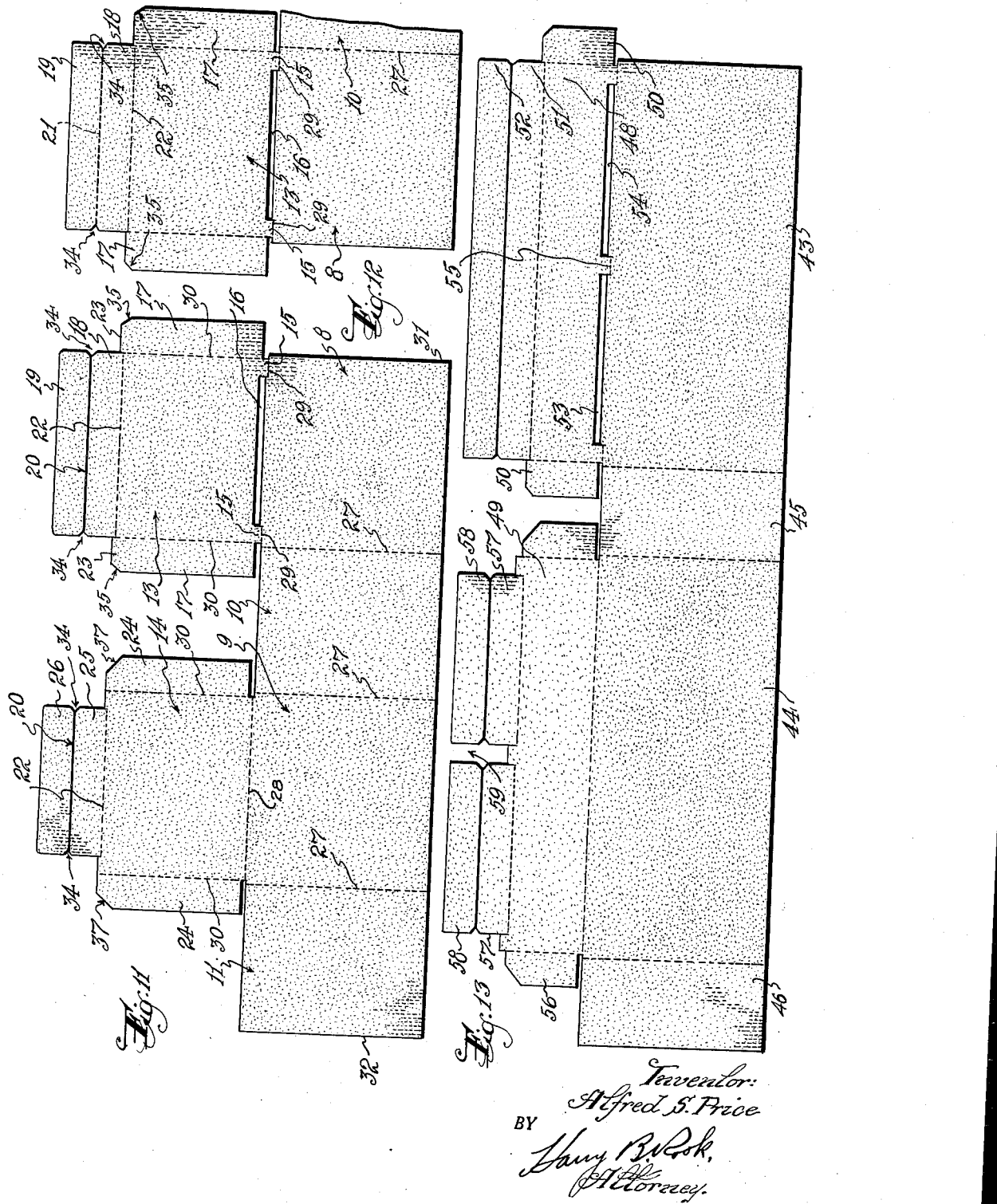
Inventor:
Alfred S. Price
BY
Harry B. Cook,
Attorney.

Patented Mar. 9, 1954

2,671,599

UNITED STATES PATENT OFFICE 2,671,599

STORAGE BATTERY TOP PROTECTOR

Alfred S. Price, Teaneck, N. J.

Application July 25, 1950, Serial No. 175,699

3 Claims. (Cl. 229—16)

The invention relates to top protectors or slip-over covers for electric wet storage batteries.

A prime object of the present invention is to provide a protector for protecting the battery from damage during transportation and storage.

A special object of the invention is to provide a protector that will prevent damage to or short circuiting of the terminals or cell connectors of the battery during transportation and storage.

Another object of the invention is to provide a protector that will prevent the casing and composition material of the battery and the terminals and cell connectors thereof from being damaged by a sudden impact, shock or superimposed load.

Another object of the invention is to provide a protector for a battery that will facilitate the stacking of the batteries in such manner that the superimposed load is transmitted directly to the battery casing only whereby the terminals, cell connectors and composition material are adequately protected.

Another object of the invention is to provide a protector that can readily be applied to the battery while it is on the conveyor belt of the assembly line.

Other objects of the invention are to provide a protector or cover for a battery that can be applied to batteries of various sizes and shapes, is self-contained, is self-locking when assembled, has no protruding portions on its interior, is constructed to meet all requirements of local and nation-wide governing and regulating bodies, is light in weight, strong, durable and inexpensive to manufacture.

The invention will be better understood from the description thereof to follow taken in connection with the accompanying drawings in which—

Figure 1 is a perspective view of a protector embodying one form of my invention applied to a wet storage battery, showing the outer wall section of the top wall in open position in dot-dash lines.

Figure 2 is an enlarged vertical sectional view taken on the plane of the line 2—2 of Figure 1.

Figure 3 is a fragmentary vertical sectional view taken on the plane of the line 3—3 of Figure 1, the battery being omitted.

Figure 4 is a vertical sectional view taken on the plane of the line 4—4 of Figure 1, the battery being omitted and parts being broken away.

Figure 5 is a fragmentary vertical sectional view taken on the plane of the line 5—5 of Figure 1, the battery being omitted.

Figure 6 is a fragmentary sectional view similar to Figure 4 but showing the outer section of the top wall in open position.

Figure 7 is a perspective view of a protector embodying a modified form of the invention applied to a wet storage battery of a different type and showing the upper section of the top wall in open position in dot-dash lines.

Figure 8 is an enlarged vertical sectional view taken on the plane of the line 8—8 of Figure 7.

Figure 9 is a fragmentary vertical sectional view taken on the plane of the line 9—9 of Figure 7, the battery being omitted.

Figure 10 is a perspective view of a fragment of a top wall section.

Figure 11 is a plan view of the blank from which the protector of Figure 1 is made.

Figure 12 is a fragmentary plan view of the reverse side of the right hand end of the blank of Figure 11.

Figure 13 is a plan view of the blank from which the protector of Figure 8 is made.

Referring to Figure 1, a wet storage battery 1 is illustrated with a protector or cover 2 embodying one form of my invention applied thereto. The battery is of the usual type having three cells placed side by side and enclosed in an outer casing 3 having an upper peripheral flange portion 4 with the usual terminals 5, cell connectors 6 and filling caps 7 extending thereabove.

The protector 2 is rectangular in shape and formed by punching, cutting and scoring a single sheet or blank of corrugated cardboard shown in Figure 11. The finished protector comprises side walls 8 and 9, end walls 10 and 11, a top wall 12 and has an open bottom end. The top wall includes an inner wall section 13 and an outer wall section 14 folded in reverse directions across the top of the protector.

One side of the inner top wall section 13 is hingedly connected to side wall 8 by hinge strips 15 at each end thereof formed by cutting away a portion of the wall section 13 adjacent the side wall 8 and thereby providing an elongated slot 16 as shown in Figures 6 and 11. This wall section 13 is formed with hinged flaps 17, 17 along its ends and with an extension at its opposite free side including an inner flap member 18 and an outer flap member 19 hinged thereto. The flap member 19 is formed by cutting through the thickness of the cardboard material across the inner surface of the extension along the heavy line 20 of Figure 11 leaving only a thin membrane 21 on the outer surface of the extension holding the two flap members together. The extension is hinged along the fold line 22 and this fold line is positioned rearwardly or inwardly of the adjacent edges 23 of the end flaps 17, 17 so that when the outer flap member 19 is folded over the inner flap member 18 the outer surface of the outer flap member will be in vertical alignment with edges 23.

The outer top wall section 14 is formed similarly to the inner wall section 13 but is hinged to side wall 9. Wall section 14 has hinged flaps 24, 24 on its ends corresponding to hinged flaps 17, 17 and has an extension comprising inner and outer flaps 25 and 26 corresponding to inner and outer flaps 18 and 19, respectively. Flaps 25 and 26, however, are only as long as the slot 16. The outer top wall section 14 however has no slotted portion.

In actual practice the protector is formed from a single blank of corrugated cardboard material and cut to the blank form shown in Figure 11. The side walls 8 and 9 and end walls 10 and 11 are formed by folding the blank on the longitudinal parallel fold lines 27, and the top wall by folding the blank on the fold lines 28 and 29, 29, while flaps 17 and 24 are bendable on the fold lines 30 and the extensions on the fold lines 22. The meeting edges 31 and 32 of the side wall 8 and end wall 11, respectively, may be secured together by a strip of adhesive tape 33 or in any other suitable manner.

To close the top wall, the end flaps 17, 17 of the inner wall section 13 are folded inwardly along the fold lines 30 until they are disposed at right angles to the plane of the body of said wall section. The inner extension flap 18 is folded inwardly along the fold line 22 and the outer flap 19 folded over the inner flap 18. The material of the extension may be notched at each end of the line 20 as indicated at 34 to facilitate folding of the flaps. The inner wall section 13 with its folded flaps is swung to closed position between the side walls 8 and 9 and the end walls 10 and 11 whereby the end flaps 17 depend inwardly or downwardly as viewed in Figure 2, leaving a small space between each end flap and the adjacent side wall. The folded over inner and outer flap members 18 and 19, respectively, are swung to a position adjacent the side wall 9 with the outer surface of the outer flap member 19 abutting against the inner surface of said wall 9. The corners of the end flaps 17, 17, adjacent the extension, may be cut away as indicated at 35 to facilitate entry of the flaps between the walls of the protector. When the flap members 18 and 19 are thus folded and swung to closed position, they present a square flat bearing surface 36 perpendicular to the planes of said flap members with the membrane portion 21 between the flap members as shown in Figure 6. The inner edges of the flaps 17, 17, also present a square flat bearing surface.

The end flaps 24, 24 and extension flaps 25 and 26 of the outer top wall section 14 are similarly folded and the outer wall section then folded along the fold line 28 and swung over the inner wall section 13 in a reverse direction as shown in Figure 6 carrying the side flaps 24, 24 through the spaces between the inner side flaps 17, 17 and the side walls and carrying the folded extension flaps 25 and 26 through the slot 16 between the inner wall section 13 and the side wall 8. The end or side flaps 24, 24 may be cut away as indicated at 37 to facilitate closing of the outer wall section 14.

When the top wall sections 13 and 14 are thus closed, a double or two-ply top wall is provided.

The extension flaps 18 and 19 of the inner wall section 13 with the side wall 9 provide a three-ply thickness of cardboard at said side, for the entire length of said side. On the opposite side of the protector, the extension flaps 25 and 26 of the outer wall section 14 and the side wall 8 also provide a three-ply thickness of material for substantially the entire length of the side wall. The flaps thus brought into assembled position serve to reinforce the upper end of the protector and to maintain the end and side walls in rigid angular relation. All of the flaps extend an equal distance inwardly so that the inner ends thereof present a substantially continuous flat bearing surface as shown in Figures 3 and 4.

The protector may be made of various sizes to fit various sizes of batteries.

In use, the open bottom end of the protector is slipped over the top of the battery casing 3 and slid down thereover until the inner bearing surfaces of the flaps seat on the top surface of the battery casing along its marginal edges as shown in Figure 2. When the flaps are seated on the casing, the side and end walls of the protector are only sufficiently long to extend downwardly to a point above the bottom end of the battery casing so that they are spaced above the supporting surface for the battery and are not supported thereby. The flaps are sufficiently high as viewed in Figure 2 to provide a space between the top of the battery casing and the top wall of the protector to provide an air cell space above the battery and to allow the terminals, cell connectors and filling caps to remain free so that they will not support any superimposed load or receive any shocks. It will thus be apparent that the double-walled flaps of the top wall will absorb any load, impact or shock and transmit such load, impact or shock to the upper surface of the rigid battery casing only.

The protector excludes moisture and otherwise protects the battery from damage or marking so that the battery when shipped will remain in ready marketable condition upon reaching its destination. The completed and assembled protector also is flat-sided and rectangular in section and has a flat top so that the covered batteries may be stacked side by side and one upon the other. The protector is also readily collapsible.

The protector shown in Figure 7 embodies a modified form of the invention and is for protecting a type of wet storage battery having an elongated narrow casing, 38, rectangular in section, either horizontally or vertically, for enclosing three cells connected end to end. The battery has the usual upper peripheral flange portion 39 and the usual terminals 40, cell connectors 41 and filling caps 42 extending above the casing.

This protector is narrow, elongated and rectangular in shape and is formed of the same material as the form of protector of Figure 1. The protector is constructed similarly to the form of Figure 1 and may be formed from a blank such as shown in Figure 13. The protector comprises elongated side walls 43 and 44 and end walls 45 and 46 and a top wall 47. The top wall includes an inner top wall section 48 and an outer wall section 49 folded over the inner section in a reverse direction. The inner top wall section 48 has side flaps 50, 50 corresponding to flaps 17 and has inner and outer extension flaps 51 and 52, respectively, corresponding to the inner and outer extension flaps 18 and 19, respectively, the inner top wall section 13 of the form of protector of Figure 1. In this modified form, however, the inner wall section 48 is formed with two aligned slots 53 and 54, with a solid hinge member 55 in between instead of a single slot 16 as in the form of Figure 1 in order to provide the necessary rigidity for the wall section 48 and to prevent its sagging. The outer wall section 49 is formed with side flaps 56, 56 corresponding to the flaps 24 of Figure 1, and with two spaced extensions, each including an inner flap 57 and an outer flap 58 corresponding to extension flaps 25 and 26, respectively. When the top wall sections are folded the extension flaps extend through the slots 53 and 54, the space 59 between the sections providing the necessary clearance for the hinge member 55.

The inner flat edges of the flaps seat on the marginal edges of the upper surface of the battery casing and function the same as the flaps of the form of protector of Figure 1 in protecting the battery against impacts, shocks and loads and in providing the necessary ventilation for the battery.

From the foregoing, it will be seen that due to the constructions shown and described, the weight of the upper batteries when positioned one upon another will be supported directly upon the upper surface of the rigid battery casing and will not permit the upper battery to rest on or contact the battery terminals, cell connections or filling caps, thereby ensuring against damage during shipment or storage.

Changes in details of construction might be made without departing from the principle of the invention.

What I claim is:

1. A collapsible slip-over cover for a wet storage battery comprising a one-piece rectangular shaped body of cardboard material having flat top, side and end walls and an open bottom end, said top wall including an inner wall section hinged to the top of one side wall and having side flaps inside said body in contact with the upper inner surfaces of said end walls and also having a double-walled flap on its side opposite its hinged side comprising two thicknesses of said cardboard material disposed inside said body and in contact with the upper inner surface of the adjacent side wall, said top wall also including an outer wall section in superposed contact with said inner wall section and hinged to the top of the side wall opposite the side wall that supports said inner wall section, said outer wall section also having side flaps in side-by-side contact with the side flaps of the inner wall section and also having a double-walled flap on its side opposite its hinged side formed of two thicknesses of said cardboard material and disposed inside said body along the upper surface of the side wall that supports said inner wall section, all of the thicknesses of cardboard material forming said flaps having flat cut inner edges perpendicular to the planes of the respective thicknesses and disposed in a common plane for seating edgewise on the upper marginal edge of a storage battery contained in the cover.

2. A collapsible slip-over cover for a wet storage battery as defined in claim 1 wherein said inner wall section has an elongated slot adjacent and parallel to its hinged connection with the side wall, and the double-walled flap on the outer wall section extends through said slot into said body alongside the upper inner surface of the side wall on which the inner wall section is hinged.

3. A collapsible slip-over cover for a wet storage battery as defined in claim 1 wherein said inner wall section has two longitudinally aligned slots adjacent and parallel to its hinged connection with the side wall to which the inner wall section is hinged, and said outer wall section has a double-walled flap extending through each of said slots into the body alongside the side wall that supports the inner wall section.

ALFRED S. PRICE.

References Cited in the file of this patent

UNITED STATES PATENTS

| Number | Name | Date |
| --- | --- | --- |
| 177,279 | Ritter | May 9, 1876 |
| 370,982 | Smith | Oct. 4, 1887 |
| 627,334 | Ingersoll | June 20, 1899 |
| 1,351,278 | Billstein | Aug. 31, 1920 |
| 1,965,215 | Boeye | July 3, 1934 |
| 2,017,176 | Andrews | Oct. 15, 1935 |
| 2,132,957 | Mahone | Oct. 11, 1938 |
| 2,306,328 | Biberthaler | Dec. 22, 1942 |
| 2,536,442 | Guyer | Jan. 2, 1951 |